United States Patent
Harris et al.

[11] Patent Number: 5,342,086
[45] Date of Patent: Aug. 30, 1994

[54] CLOSURE FOR AN INFLATABLE RESTRAINT SYSTEM

[75] Inventors: Bradley D. Harris, Farmington; Quin Soderquist, South Weber, both of Utah

[73] Assignee: Morton International, Inc., Chicago, Ill.

[21] Appl. No.: 56,558

[22] Filed: May 3, 1993

[51] Int. Cl.$^5$ .............................................. B60R 21/20
[52] U.S. Cl. .................................. 280/728 B; 280/731
[58] Field of Search ................... 280/728 B, 731, 732, 280/728 A, 728 R

[56] References Cited

U.S. PATENT DOCUMENTS

| | | | |
|---|---|---|---|
| 3,622,176 | 11/1971 | Byer | 280/150 |
| 4,964,652 | 10/1990 | Karlow | 280/731 |
| 4,989,896 | 2/1991 | DiSalvo et al. | 280/732 |
| 5,002,307 | 3/1991 | Heidorn | 280/731 |
| 5,013,065 | 5/1991 | Kreuzer | 280/743 |
| 5,060,971 | 10/1991 | Nanbu et al. | 280/728 |
| 5,069,477 | 12/1991 | Shiraki | 280/732 |
| 5,082,310 | 1/1992 | Bauer | 280/732 |
| 5,087,071 | 2/1992 | Wallner | 280/743 |
| 5,143,401 | 9/1992 | Zushi | 280/731 |

FOREIGN PATENT DOCUMENTS

| | | | |
|---|---|---|---|
| 0303949 | 12/1990 | Japan | 280/728 B |
| 0096454 | 4/1991 | Japan | 280/728 B |
| 4015145 | 1/1992 | Japan | 280/728 B |
| 4050053 | 2/1992 | Japan | 280/728 B |
| 4135946 | 5/1992 | Japan | 280/728 B |

Primary Examiner—Margaret A. Focarino
Assistant Examiner—Peter English
Attorney, Agent, or Firm—Nick C. Kottis; Gerald K. White

[57] ABSTRACT

A closure for an air bag deployment opening is provided. The closure includes at least one stress concentration feature adapted to form, under the influence of an inflating bag, a selected initial opening in the face portion of the closure for the deployment of the bag therethrough.

17 Claims, 2 Drawing Sheets

CLOSURE FOR AN INFLATABLE RESTRAINT SYSTEM

BACKGROUND OF THE INVENTION

This invention relates generally to inflatable restraint systems and, more particularly, to an improved closure for use with an installation of an inflatable cushion, commonly referred to as an air bag.

Safety restraint systems which self-actuate from an undeployed to a deployed state without the need for intervention by the operator, i.e., "passive restraint systems", and particularly those restraint systems incorporating inflatable bags or cushions, as well as the use of such systems in motor vehicles have been the subjects of much discussion as the desirability of the use of such passive restraint systems has gained general acceptance in the United States.

It is well known to protect a vehicle occupant using a cushion or bag that is inflated with gas, e.g., an "air bag", when the vehicle encounters sudden deceleration, such as in a collision. During deployment, the rapidly evolving gas with which the bag is typically filled is an inert gas, e.g., nitrogen. In such systems, the cushion is normally housed in an uninflated and folded condition to minimize space requirements. Upon actuation of the air bag system, gas is discharged from an inflator to rapidly inflate the bag. The cushion, upon inflation, serves to restrain the movement of the vehicle occupant as the collision proceeds. In general, such air bags are commonly designed to be inflated in no more than about 30–60 milliseconds.

Inflatable restraint systems have been devised for automotive vehicles in which one or more air bags are stored in one or more storage compartments within the vehicle. In general, an air bag provided for the protection of a vehicle driver, i.e., a driver side air bag, is stored within a housing mounted in a storage compartment located in the steering column of the vehicle. Whereas, an air bag for the protection of a front seat passenger, i.e., a passenger side air bag, is typically stored within a housing mounted in the instrument panel/dash board of the vehicle. In either case, the housing generally has a cover or some form of closure panel member having a face portion to provide closure to the opening through which the air bag will be deployed upon actuation.

In order to reduce the likelihood of tampering with the system, the closure panel member is commonly designed so as to minimize the visual impression of the presence of the air bag and air bag deployment opening thereunder. Thus, such closure panel members are typically designed to match or otherwise be compatible with the interior design of the vehicle.

Also to this end, appearance or otherwise cosmetic problems such as read through and sink marks are sought to be avoided. Read through (e.g., where shapes or features on the backside of the closure can be relatively easily discerned from a viewing of the front side of the closure) and sink marks (e.g., where the closure has an undesired, lower or uneven outer surface) can result from processing. For example, when the closure is prepared by molding fabrication of a thermoplastic elastomer, an uneven shrinkage of the closure material upon processing can result in read through and/or sink marks.

In practice, closure panel members are commonly designed so as to be torn or otherwise opened along predetermined lines as a result of the force exerted against the closure by way of the inflating air bag and thus form air bag release doors. To this end, the closure is typically pre-weakened, such as by perforating or reducing the thickness of the cover, for example, along such preformed tear lines, paths or seams, generally commonly referred to herein as "tear ways".

In many previous designs, the tear ways are typically of uniform strength, e.g., the tear ways are of uniform thickness and consistency, throughout the closure. As a result, the location of the initial tearing or opening of the closure can typically vary, depending largely upon the manner in which the force of the inflating air bag is applied against the closure which in turn is largely dependent upon the way in which the air bag is folded as well as the conditions under which the system is being used. For example, tearing of the tear way may undesirably start at a location near the end of the respective tear way, e.g., near the edge of the face portion of the closure. As will be appreciated, the manner in which the closure is torn can detrimentally affect the manner in which the air bag is inflated and the shape or form taken thereby, and thus result in inflation of the bag in a non-optimal manner.

Thus, in order to be able to effect the deployment in an orderly process it is desirable to be able to control the point or location of the initial opening in the closure, wherethrough the air bag first begins deployment into the passenger compartment of the vehicle.

One approach has been to vary or alter the strength, e.g., the thickness and/or consistency, of a respective tear way in the closure. For example, U.S. Pat. No. 5,013,065 discloses the use of a rupturable cover of continuously increasing thickness and having rated break lines therein. U.S. Pat. No. 5,060,971 discloses varying the strength of the weakened zones, e.g., tear lines, such as by: 1) using rows of spaced-apart grooves along the weakened zone with the grooves being more closely spaced together at the initial opening location, 2) using grooves along the weakened zone with deeper grooves, i.e., thinner cover, at the initial opening location, and 3) using interconnected grooves consisting of spaced-apart deeper grooves of substantially uniform size and shape and shallower grooves in spaces between the deeper grooves with the deeper grooves being closer together in the initial opening area.

In addition, a number of patents identify various groove geometries for fracture lines, hinges and other portions of air bag covers. For example, U.S. Pat. No. 3,622,176 discloses using V-shaped grooves along the fracture lines and hinge elements having rounded root grooves, so as to avoid fracture. Other or similar cover groove geometries are shown in other patents including U.S. Pat. No. 4,964,652; 5,002,307; 5,069,477; 5,087,071; and 5,143,401.

A common problem with approaches wherein the thickness of the tear ways of the closure are specially altered or varied along the length thereof, such as at the site of initial opening is that closures with particularly thin tear ways, such as those tear ways having sections or portions such as tear ways of a thickness of 0.35 mm or less, are commonly more susceptible to failure due to fatigue and consequent inadvertent or accidental opening as well as undesired opening such as may result from tampering. Furthermore, with molded closures such particularly thin initial opening sites are more likely to be visible to an occupant which is generally aesthetically undesirable.

In addition, the inclusion in a closure of a pre-weakened initial opening site typically results in such closure being invariably more difficult to manufacture as items having such thin sections are, for example, difficult to form via molding fabrication.

In contrast to tear ways of substantially uniform thickness, tear ways with graduated or steadily varying thickness while typically providing greater control over the closure opening process including the site of the initial opening, increase the likelihood of certain undesirable forms of closure tearing, such as tearing outside of the tear path. For example, when a closure is undergoing tearing along a tear path and the tearing action reaches a point in the tear way at which there is an abrupt increase in the thickness of the tear way, the abrupt change in thickness can result in tearing outside of the tear path. In the case of a tear way of gradually increasing thickness, as the thickness of the tear way increases, the difference in thickness of material at the tear way and the adjacent sections of the face portion diminishes, increasing the likelihood of non-tear way tearing of the closure.

SUMMARY OF THE INVENTION

A general object of the invention is to provide an improved closure for an air bag deployment opening of an air bag assembly adapted to be integrated into a vehicle, with the air bag assembly including a housing for accommodating a collapsed inflatable air bag.

A more specific objective of the invention is to overcome one or more of the problems described above.

The general object of the invention can be attained, at least in part, through a closure having a) a mounting portion securable to the assembly housing, b) a face portion defining therein weakened tear ways adapted to tear and form release doors under the influence of inflating of the air bag, and c) a hinge portion adapted to join at least one of the release doors with the mounting portion after the formation of the doors. The closure additionally includes at least one stress concentration feature adapted to form, under the influence of the inflating bag, an initial opening at a selected location in the face portion of the closure for the deployment of the air bag.

Inflatable restraint system closures of the prior art which fail to provide an initial opening site at a controlled and/or desired location can result in the closure tearing in an uncontrolled fashion and in the non-optimal deployment of the air bag. Further, prior art closures which vary the tear way thickness can increase the likelihood of the closure tearing at a location other than on the tear way. In addition, prior art utilization of particularly thin tear ways at the initial opening site commonly results in such initial opening site tear ways being readily more visible to an occupant and/or more susceptible to failure due to fatigue.

The closures of the invention, by providing an initial opening site at a selected location, can result in a more controlled and/or orderly tearing or opening of the closure and deployment of the bag therethrough. In addition, closure and opening thereof related problems can be eliminated or reduced through the use of an initial opening tear way of uniform thickness.

The invention further comprehends such a closure made of a homogeneous plastic material having an initial opening site at a selected location and which closure includes at least one reinforcing rib extending the length of at least one of the doors from the initial opening site to the hinge portion joining the door with the mounting portion. In such a closure, the hinge portion is of a width substantially less than that of the doors and is joined to the door at a side opposite the initial opening site.

The invention still further comprehends such a closure made of a homogeneous plastic material with a tear way having a V-shaped groove at the site selected for initial opening with a more rounded groove tear way adjacent thereto.

As used herein, references to "tear way thickness" are to be understood to refer to the thickness, at the tear way, of the material comprising the closure.

Other objects and advantages will be apparent to those skilled in the art from the following detailed description taken in conjunction with the appended claims and drawings.

BRIEF DESCRIPTION OF THE DRAWINGS

For ease of illustration and discussion, like parts in the drawings are designated by the same reference numeral.

DETAILED DESCRIPTION OF THE INVENTION

Figure 1:
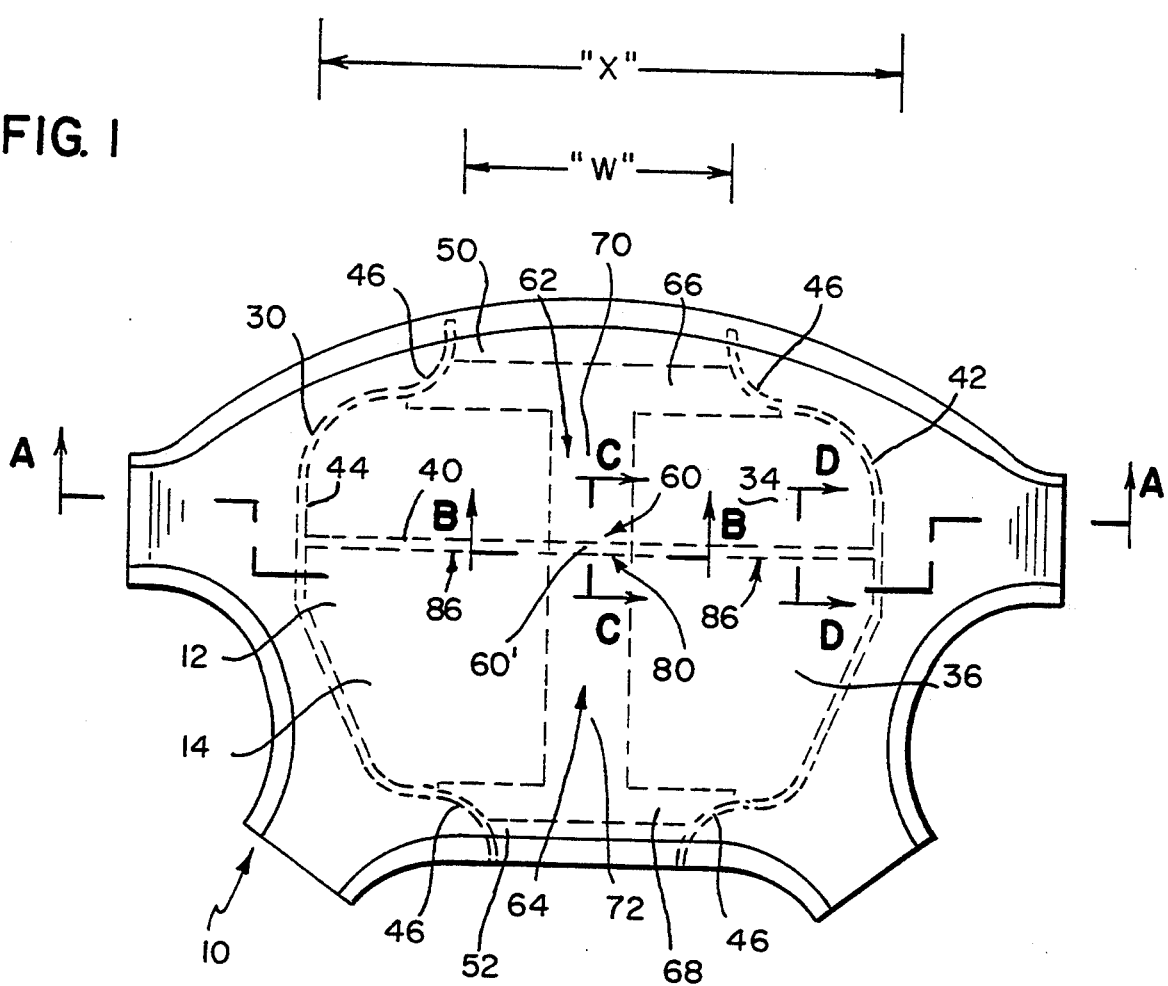
FIG. 1 is a simplified top view of a closure for an air bag deployment opening of an air bag assembly, inflatable restraint system, in accordance with one embodiment of the invention.

The present invention, as is described in more detail below, provides an improved closure for an inflatable restraint system, e.g., for an air bag deployment opening of an air bag assembly. While the invention will be described with reference to a driver side inflatable restraint module assembly for automotive vehicles including vans, pick-up trucks, and particularly automobiles, it is to be understood that the invention also has applicability not only with other types or kinds of air bag module assemblies for automotive vehicles including passenger side assemblies, but also other types of vehicles including, for example, airplanes.

Referring to the drawings, a closure, generally designated 10, for an air bag deployment opening (not shown) is illustrated. Such an opening occurs in properly actuated air bag assembly inflatable restraint systems. The closure 10, as the closure panel members described above, is designed to tear or otherwise open along predetermined lines as a result of the force exerted on the closure by way of the inflating air bag and thus form air bag release doors. In this way, and such as in the event of a particular collision by a vehicle so equipped, the air bag will deploy through such an opening to provide desired cushioning to a specifically positioned occupant. Further, as described above with reference to such air bag assemblies for the protection of a vehicle driver, the assembly is situated in the steering wheel of the vehicle, e.g., automobile.

The closure of the invention preferably is a molded homogeneous member in that no reinforcements are molded into it, such as made of plastic. A high pressure injection molding material such as a thermoplastic is preferred. A currently preferred material for use for the closures of the invention is a thermoplastic rubber such as SANTOPRENE (a trademark of Monsanto Company).

The closure 10 includes a face portion 12 having a top side 14 (see FIG. 1) and a bottom side 16 (see FIG. 2), a mounting portion 20 including four locking arms 22(A-D), and an outer surface side wall 24. In the illustrated embodiment, the face portion 12 is shown as a substantially flat or planar member. It is to be understood, however, that the geometrical form of the closure and specifically the face portion thereof can be appropriately altered or shaped so as to better match or conform to specific desired application locations or sites.

Figure 2:
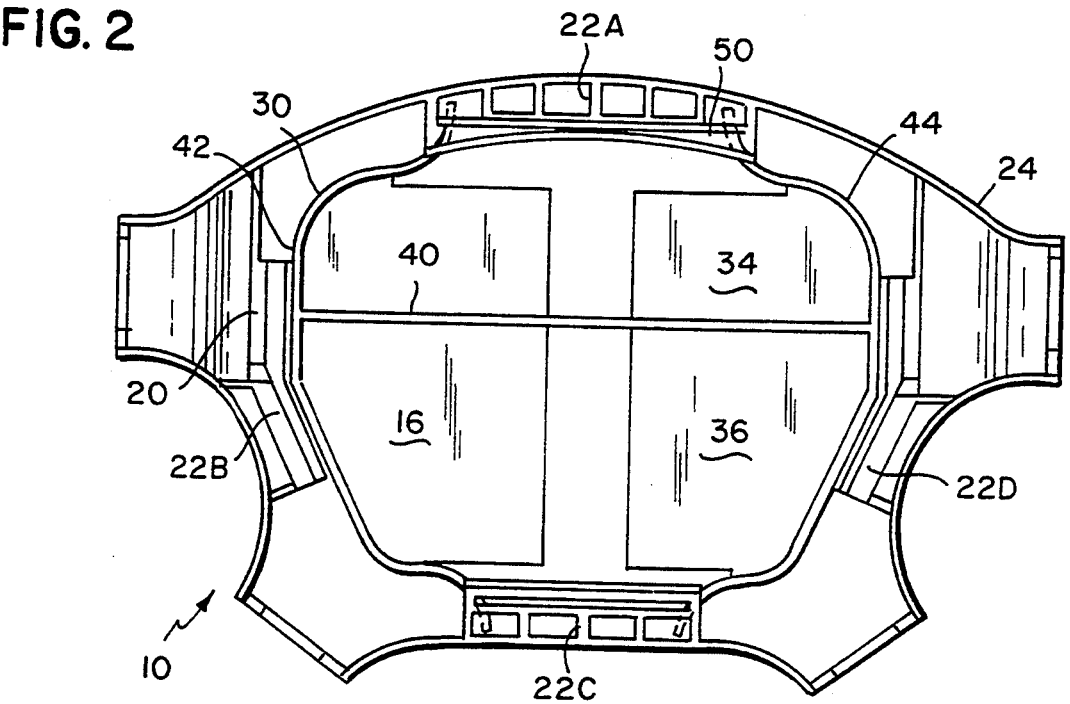
FIG. 2 is a simplified bottom view of the closure of FIG. 1.
Figure 3:
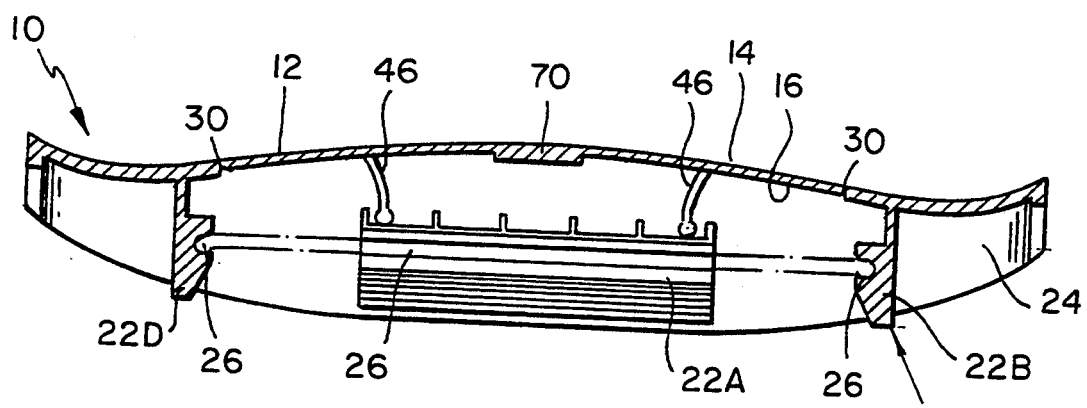
FIG. 3 is a simplified enlarged cross sectional view of the closure of FIG. 1 taken substantially along the line A—A of FIG. 1 and viewed in the direction of the arrows.
Figure 4:
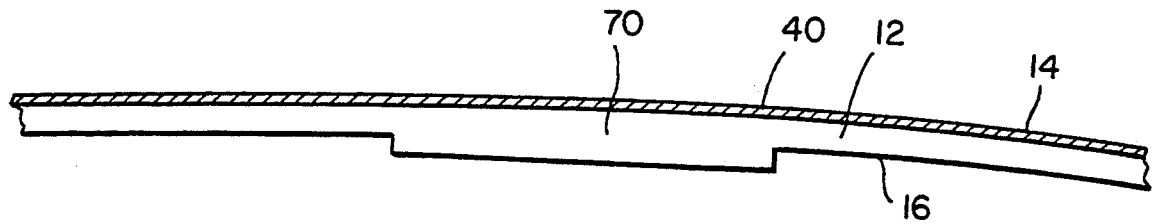
FIG. 4 is a simplified enlarged cross sectional view of the closure of FIG. 1 taken substantially along the line B—B of FIG. 1 and viewed in the direction of the arrows.

The locking arm mounting portions 22(A-D) are preferably independently moveable to facilitate mounting of the cover to a corresponding air bag assembly housing (not shown). As shown in FIGS. 1-3, the four locking arms 22(A-D) form two pairs of oppositely disposed locking arms, one set being arms 22A and 22C while the other set constitutes arms 22B and 22D. For attachment of the closure to the housing, each of the locking arms 22(A-D) includes a notch 26 for receiving a corresponding portion of assembly housing (see FIG. 3).

It is to be understood, however, that the practice of the subject invention in its broader aspects is not limited to use with any particular form or means of attachment of the closure to the housing. Thus, alternative forms or means of attachment as are known in the art, such as those that rely on the use of fastener devices such as screws or rivets, for example, can be used in a common manner to effect attachment of the closure to the housing.

It will be noted that the closure face 12 defines an array of tear ways 30. These tear ways are thin portions of the face 12 at which the closure 10 splits or otherwise tears when the air bag inflates thereagainst, thereby forming first and second hinged doors, 34 and 36, respectively. The array of tear ways 30 are generally situated in the form of the letter H. The tear way array 30 includes: a tear way 40 which generally corresponds to the cross bar of the H and first and second side tear ways, 42 and 44, respectively, which generally correspond to the side bars of the H, as viewed in FIGS. 1-2.

At each end of each of the side tear ways 42 and 44, a curved section 46 leads into a hinge portion 50, 52, respectively, adjacent the locking arms 22A and 22C, respectively. After the tear ways 40, 42 and 44 have split or torn to form the doors 34 and 36, the hinge portions 50 and 52 are each adapted to join one of the release doors 34 and 36, respectively, with the mounting portion 20. In general, the hinge portions 50 and 52 are of a width "w" substantially less than the width "x" of the doors 34 and 36 at the tear way 40 (see FIG. 1), as closures so proportioned are generally better suited for providing a desired area for the deployment opening and contour shaping.

It is to be understood, however, that the practice of the invention is not limited to use in conjunction with closures wherein the hinge portions are of a width substantially less than the width of the doors formed by the closure. That is, if desired, the invention can be practiced with closures wherein the width of the hinge portions is substantially the same or greater than the width of the respective doors such as to satisfy the requirements for particular applications.

The closure 10 includes in the face portion 12 an initial opening site section, generally represented by the reference numeral 60, preferably generally centered about the center point 60'. As described above, it is desirable to be able to control the location of the initial opening in the closure. In practice, in order to effect desired and proper deployment of an inflating air bag it is generally desired or preferred that the initial opening site be centrally positioned with respect to the face portion of the closure, as shown.

The closure of the invention includes stress concentration features adapted to form, under the influence of an inflating bag, an initial opening in the closure at the initial opening site region 60. To that end and as a first stress concentration feature, the closure 10 includes in each of the doors, 34 and 36, respectively, a reinforcing rib, 62 and 64, respectively. As shown, such reinforcing ribs can generally take the form of or constitute a region of increased thickness in the face portion of the closure. In general, each of the reinforcing ribs extends the length of the respective door from the initial opening site region 60 to the hinge portion 50 and 52 for the respective door 34 and 36. For example, such reinforcing ribs can take the general shape of the letter T, as shown. Thus, the illustrated reinforcing ribs, 62 and 64, each include: a horizontal cross bar section, shown as 66 and 68, respectively, most adjacent the respective hinge portion and a vertical bar section, shown as 70 and 72, respectively, generally extending from the initial opening site region 60 to the cross bar section 66 and 68, respectively. In one embodiment of the reinforcing rib feature of the invention, the face portion of the closure at the ribs was 3.75 mm thick (as compared to adjacent parts of the face portion having a thickness of only 2.4 mm) and the vertical and horizontal bar sections were each approximately 25 mm wide. In general, such reinforcing ribs will be of a thickness of about 1.0 to 2.0 mm greater than the adjacent parts of the face portion of the closure.

A main factor in limiting the thickness of the reinforcing rib is a concern to avoid material problems including appearance or otherwise cosmetic problems such as read through and sink marks. For example, for closures fabricated of the thermoplastic rubber, SANTOPRENE (a trademark of Monsanto Company), the thickness of the reinforcing rib can, in general, be up to about 1.5 to about 2 times the thickness of the non-rib face portion of the closure before the closure experiences read through and/or sink marks. Generally, in order to effect greater stress concentration, such ribs preferably are fabricated as thick as possible without encountering such appearance and cosmetic problems as read through and sink marks.

Other factors relating to the thickness of the reinforcing rib utilized include constraints on the mass of the closure assembly. Thus, for example, fabrication of the reinforcing ribs of such a thickness or width that proper functioning of the hinge of the assembly is made difficult or prevented is to be avoided.

Typically, the ribs will be of uniform or near uniform thickness (plus or minus up to about 10%, dependent upon production tolerances) as such ribs will generally provide a more consistent transfer of energy/force at the desired location. In specific applications, however, varying the thickness of such reinforcing ribs may be advantageous. Thus it is to be understood that the practice of the invention in its broader aspects is not limited to the utilization of reinforcing ribs of such uniform thickness.

It will be appreciated that the location of the rib(s) may also be optimized so as to cooperate with specifically folded air bags, for example, such that upon bag deployment the pressure of the bag against the closure is concentrated onto the rib(s).

Also, the horizontal and vertical bar sections of the reinforcing ribs will generally have a width of about 10 mm to 50 mm. Moreover, in practice, a reinforcing rib of significantly less than 10 mm in width may be too narrow, while reinforcing ribs of significantly more than 50 mm in width may be too wide to effectively serve to concentrate stresses, as desired. The specific width of reinforcing rib selected will be dependent upon a number of factors including:

a) properties of the material of construction,
b) number of ribs,
c) size of the desired stress concentration area,
d) width of the tear way cross section, e.g., generally the wider the tear way cross section the larger the width of rib required and vice versa, and
e) fold of the air bag and the resulting distribution of forces resulting upon initial bag deployment.

In general, the reinforcing rib need not be of uniform width. In one preferred embodiment of the invention, a rib having a tapered width, e.g., the rib narrows near the tear way, is employed as such a shaped rib can serve to concentrate a greater proportion of the stress at the desired point, than a similar rib of uniform width. In one embodiment of a closure with a reinforcing rib so shaped, the width of the vertical bar sections, 70 and 72, respectively, was about 60–80 mm adjacent the horizontal bar sections, 66 and 68, respectively, and tapered to a width of about 10–30 mm adjacent the initial opening site.

Figure 5:
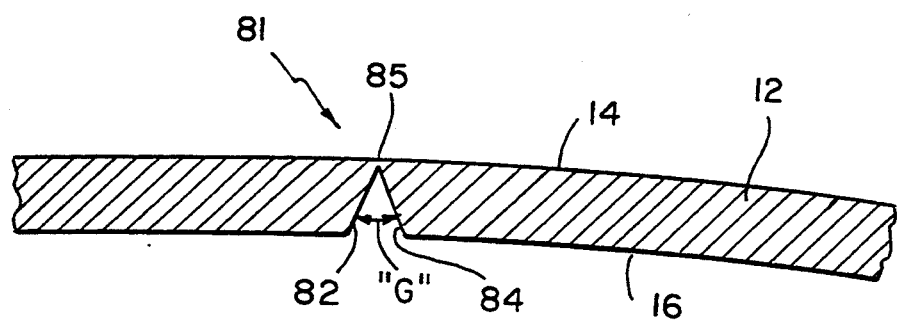
FIG. 5 is a simplified enlarged cross sectional view of the closure of FIG. 1 taken substantially along the line C—C of FIG. 1 and viewed in the direction of the arrows.

The closure 10 includes, as a second stress concentration feature, a specific altering or varying of the geometric shape of the tear way therein. More specifically, the cross bar tear way 40 includes a central region, designated by the reference numeral 80 and generally corresponding to the initial opening site region 60, having a tear way geometry in the general shape of an acute, V-shaped groove 81, as shown in FIG. 5, wherein first and second groove side walls, 82 and 84, respectively, are joined together, preferably at an acute angle "G". It will be appreciated that while the groove 81 has been identified as V-shaped, due to processing limitations the V-shaped groove of the invention can have a somewhat flattened bottom edge 85 at the tip side of the "V." For example, in molding fabrication, the die pieces used to fabricate molded pieces having acute angles generally undergo significant wear. As a result it is generally difficult to produce, for extended manufacturing periods, molded pieces with acute angles. Consequently, the incorporation of such a flattened bottom edge in a piece so molded can improve die life. It is to be understood, however, that the width of such flattened edge will in general preferably be minimized to the extent permitted by specific manufacturing requirements, such as a trade-off between die life and the benefits derived from a closure having a more angled tear way groove.

Figure 6:
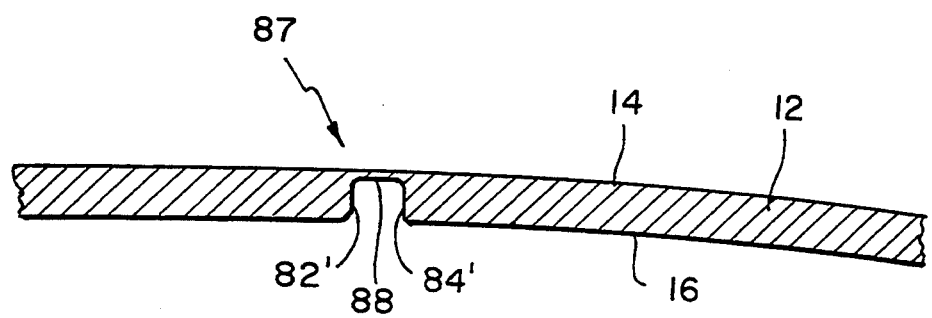
FIG. 6 is a simplified enlarged cross sectional view of the closure of FIG. 1 taken substantially along the line D—D of FIG. 1 and viewed in the direction of the arrows.

At each end of the central region 80 is a peripheral region 86 whereat the tear way groove geometry is, as shown in FIG. 6, more rounded, forming a groove 87, wherein the groove side walls, 82' and 84', respectively, are joined via a groove section 88.

The so positioned and shaped tear way regions are adapted to form, under the influence of the inflating bag, an initial opening, at a selected site or location, in or on the face portion of the closure for the deployment of the air bag. In practice, each of the side walls 82' and 84' can be joined to the groove section 88 at an acute, obtuse or right angle, as desired. In the illustrated embodiment, the groove section 88 is shown as being relatively flat. It is to be understood, however, that the groove section 88 can be rounded or otherwise shaped as desired to satisfy the requirements of particular applications.

Furthermore, such a central region tear way so shaped will preferably generally extend along such central cross bar tear way 40 at least about the width of the such centrally located reinforcing rib. In the case of a closure not utilizing such reinforcing ribs, the central region will preferably extend at least about 15 mm of each side from the center point of the face portion 12, e.g., from the center point 60'.

In one preferred embodiment, the tear way thickness is substantially the same for both the V-shaped groove 81 tear way geometry and the more rounded groove 87 tear way geometry.

While not wishing to be bound by any particular theory of operation, it is believed that the V-shaped groove tear way has less ability to elongate upon the application of a given load and as compared to the more rounded groove geometry in the tear way adjacent thereto. Thus, the stresses exerted upon the closure by an inflating air bag will preferentially be concentrated at the initial opening site, resulting in the closure first opening at said site.

After the tear way is initially opened, the closure of the invention can or will in general operate in a manner similar to other air bag closures. That is, the tear ways of the face portion will continue tearing and form release doors under the influence of inflating of the air bag. The air bag can then properly exit from the assembly through the doors formed by the closure, e.g., the air bag will initially start pillowing out of the assembly at initial opening in the closure. As the initial opening is preferably centrally located on the closure the desirable symmetric deployment of the air bag can be more readily realized. The thus deployed air bag can then more easily attain its fully inflated state and more readily effect desired restraint of the vehicle occupant.

It is to be understood that while, as described above, the tear ways can in general be thin portions in the face portion of the closure which split when the air bag inflates, the stress concentration features of the invention whereby a first or initial opening can be formed in the face portion expressly does not include reducing or otherwise varying the tear way thickness. In fact in one preferred embodiment of the invention as illustrated in the figures, the closure material along the tear way is maintained at a substantially uniform thickness (a thickness of 0.5 mm, for example), particularly along the tear way 40 and the first 20–50 mm of each tear way 42 and 44, respectively, from the point of joinder of such side tear ways with the tear way 40. Further, in such preferred embodiment, the balance of the side tear ways 42 and 44, respectively, are preferably of greater thickness (e.g., a thickness of 0.8 mm) to help ensure the ordered tearing of the closure and deployment of the bag therethrough.

It is to be understood, however, that the inclusion of such stress concentration features as in the practice of the invention does not preclude varying the tear way thickness or otherwise altering the tear resistance along the length of the tear way, such as at the desired site of the initial opening. For example, in some applications in addition to incorporating one or more stress concentration features of the invention as described herein, it may be desirable to reduce the thickness of the tear way material or incorporate one or more weakening features, such as notches or such as described here above, at the desired initial opening site.

It is to be appreciated, that such incorporation of one or more weakening features and/or reduction of the thickness of the tear way material can be relatively easily realized in the case of such a closure prepared via injection molding. Thus, at least partially as a result thereof, the preparation of such a closure via injection molding is generally preferred.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

We claim:

1. A closure for an air bag deployment opening of an air bag assembly adapted to be integrated into a vehicle with the assembly including a housing for accommodating a collapsed inflatable air bag wherein the closure comprises:
   a) a mounting portion securable to the housing,
   b) a face portion defining therein weakened tear ways which tear and form release doors under the influence of inflating of the air bag, and
   c) a hinge portion joining at least one of said release doors with said mounting portion after the formation of said doors,
said closure additionally comprising at least one stress concentration feature whereby, under the influence of the inflating bag, an initial opening for the deployment of the air bag is formed at a selected location on said face portion, wherein a first said stress concentration feature comprises a tear way having a V-shaped groove at the location of the initial opening with said tear way having a more rounded groove adjacent said V-shaped groove.

2. The closure of claim 1 including a second stress concentration feature comprising at least one reinforcing rib extending the length of at least one of said doors from the initial opening location to the hinge portion joining said door with said mounting portion.

3. The closure of claim 1 for a driver side air bag deployment opening located in the steering column of the vehicle, said closure being a molded homogeneous member fabricated of thermoplastic rubber.

4. The closure of claim 1 wherein said hinge portion has a width substantially less than a width of said doors.

5. The closure of claim 1 wherein the location of the initial opening is centrally positioned relative to said face portion.

6. A closure having a selected initial opening site for an air bag deployment opening of an air bag assembly adapted to be integrated into a vehicle with the assembly including a housing for accommodating a collapsed inflatable air bag wherein the closure comprises a homogeneous plastic material and includes:
   a) a mounting portion securable to the housing,
   b) a substantially flat face portion defining therein weakened tear ways of substantially uniform thickness which tear and form, under the influence of inflating of the air bag, release doors extending substantially across the width of said face portion with said selected initial opening site being adjacent a first side of at least a first of said release doors, and
   c) a hinge portion of a width substantially less than the width of said doors and joining said at least a first of said release doors with said mounting portion after the formation of said doors, said hinge portion being joined to said at least a first of said release doors at a side opposite said first side,
said closure additionally includes a first stress concentration feature whereby, under the influence of the inflating bag, an initial opening in said face portion is formed, said feature comprising at least one reinforcing rib extending the length of said at least a first of said doors from the initial opening site to the hinge portion joining said door with said mounting portion.

7. The closure of claim 6 wherein said at least one reinforcing rib comprises the general shape of the letter T having a cross bar section adjacent the respective hinge portion and a second bar section extending from said initial opening site to the cross bar section.

8. The closure of claim 6 wherein said at least one reinforcing rib is about 1.0 to 2.0 mm thicker than adjacent parts of said face portion.

9. The closure of claim 6 fabricated of a thermoplastic rubber wherein said at least one reinforcing rib is of a thickness of up to about 1.5 to about 2 times the thickness of the non-rib face portion of said closure.

10. The closure of claim 6 wherein each of said doors comprises at least one reinforcing rib.

11. The closure of claim 6 wherein said site of said initial opening is centrally positioned relative to said face portion and additionally comprising a second stress concentration feature comprising a V-shaped groove tear way at the site of said initial opening, said V-shaped groove tear way comprising first and second groove side walls joined together at an acute angle and extending at least about 15 mm in both opposite directions from said initial opening site, with a more rounded groove tear way adjacent said V-shaped groove tear way.

12. A closure for an air bag deployment opening of an air bag assembly adapted to be integrated into a vehicle with the assembly including a housing for accommodating a collapsed inflatable air bag wherein the closure comprises a homogeneous plastic material and includes:
   a) a mounting portion securable to the housing,
   b) a face portion defining therein weakened tear ways of substantially uniform thickness which tear and form, under the influence of inflating of the air bag, release doors extending substantially across the width of said face portion, and c) a hinge portion of a width substantially less than that of said doors and joining at least one of said release doors with said mounting portion after the formation of said doors, said closure additionally includes a first stress concentration feature whereby, under the influence of the inflating bag, an initial opening is formed at a selected site on said face portion for the deployment of the air bag, said feature comprising a V-shaped groove tear way at the site of the initial opening with a more rounded groove tear way adjacent said V-shaped groove tear way.

13. The closure of claim 12 wherein the site of the initial opening is centrally positioned relative to said face portion and said V-shaped groove tear way extends at least about 15 mm in both opposite directions therefrom.

14. The closure of claim 12 wherein said V-shaped groove and said more rounded groove tear ways are of substantially the same thickness.

15. The closure of claim 12 wherein said V-shaped groove tear away comprises first and second groove side walls joined together at an acute angle.

16. The closure of claim 12 additionally comprising a second stress concentration feature comprising at least one reinforcing rib extending the length of at least one of said doors from the initial opening site to the hinge portion joining said door with said mounting portion.

17. The closure of claim 12 prepared via injection molding of a thermoplastic rubber.

* * * * *